United States Patent
Chaucer

[11] Patent Number: 5,899,529
[45] Date of Patent: May 4, 1999

[54] CHILDS SAFETY SEAT BOLSTER

[76] Inventor: Jane E. Chaucer, 403-C Oak Lake Way Ct., Chesapeake, Va. 23320

[21] Appl. No.: 08/974,396

[22] Filed: Nov. 19, 1997

Related U.S. Application Data

[60] Provisional application No. 60/031,201, Nov. 21, 1996.

[51] Int. Cl.$^6$ .............. B60N 2/28; B60N 2/42; A47D 1/00; A47D 1/10
[52] U.S. Cl. .............. 297/250.1; 5/922; 297/463.2; 224/275
[58] Field of Search ............... 5/94, 118, 630, 5/653, 654; 297/250.1, 463.2; 224/275

[56] References Cited

U.S. PATENT DOCUMENTS

| | | | |
|---|---|---|---|
| 2,676,337 | 4/1954 | Soeder | 5/94 |
| 3,265,437 | 8/1966 | Mincieli | 297/378 |
| 3,775,785 | 12/1973 | Mittendorf | 5/922 |
| 4,186,962 | 2/1980 | Meeker | 297/250 |
| 4,592,589 | 6/1986 | Hellwig | 5/654 |
| 4,762,364 | 8/1988 | Young | 297/250 |
| 5,005,903 | 4/1991 | Minardi | 297/250 |
| 5,098,161 | 3/1992 | Minami et al. | 297/464 |
| 5,102,080 | 4/1992 | Altieri, Jr. | 224/275 |
| 5,106,154 | 4/1992 | Kain | 297/250 |
| 5,236,221 | 8/1993 | Minami | 297/256.13 |
| 5,248,181 | 9/1993 | Efthimiou | 297/130 |
| 5,385,387 | 1/1995 | Kain | 297/256.16 |
| 5,468,047 | 11/1995 | Goor et al. | 297/250.1 |
| 5,524,965 | 6/1996 | Barley | 297/256.16 |

FOREIGN PATENT DOCUMENTS

| | | | |
|---|---|---|---|
| 2655512 | 6/1978 | Germany | 297/250.1 |

*Primary Examiner*—Alex Grosz
*Attorney, Agent, or Firm*—Rhodes, Coats & Bennett, L.L.P.

[57] ABSTRACT

A child's rear-facing safety seat is secured in a substantially horizontal position on a vehicle rear seat that has a seat surface extending downwardly to a joinder with a seat back, by positioning an apex of a bolster having the shape of an elongated, triangular wedge into the seat joinder, and placing the child's seat in a rear-facing position on the seating surface with the front edge of the child's seat resting on the bolster, so that the seat is maintained by the bolster in a substantially horizontal position. The bolster is preferably formed of a central section in the shape of a equilateral triangle with opposed first and second parallel, rectangular surfaces; and first and second triangular side sections, each having a rectangular side surface releasably attached to a rectangular surface of said central section. When placing a child's seat on a vehicle rear seat that has a smaller tilt, the central section can be removed, and the bolster formed by joining the side sections to each other.

20 Claims, 3 Drawing Sheets

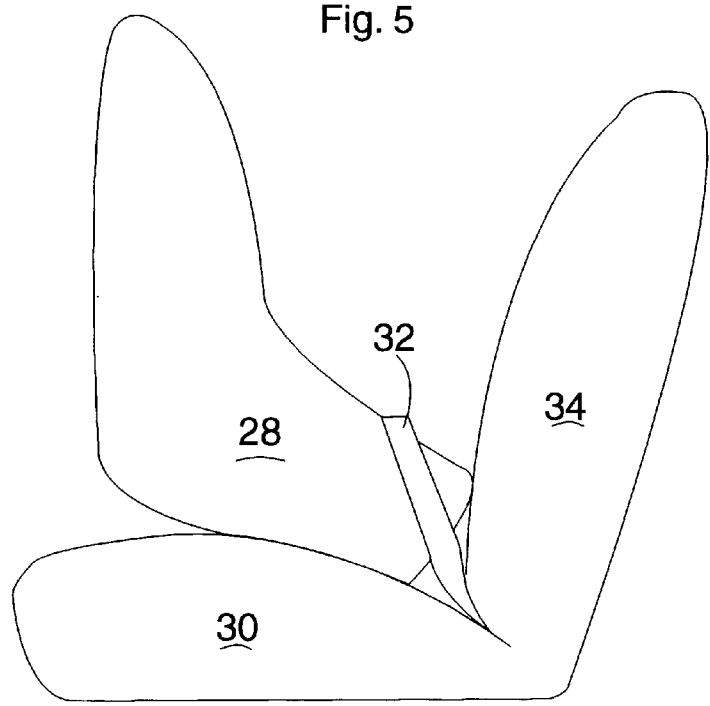
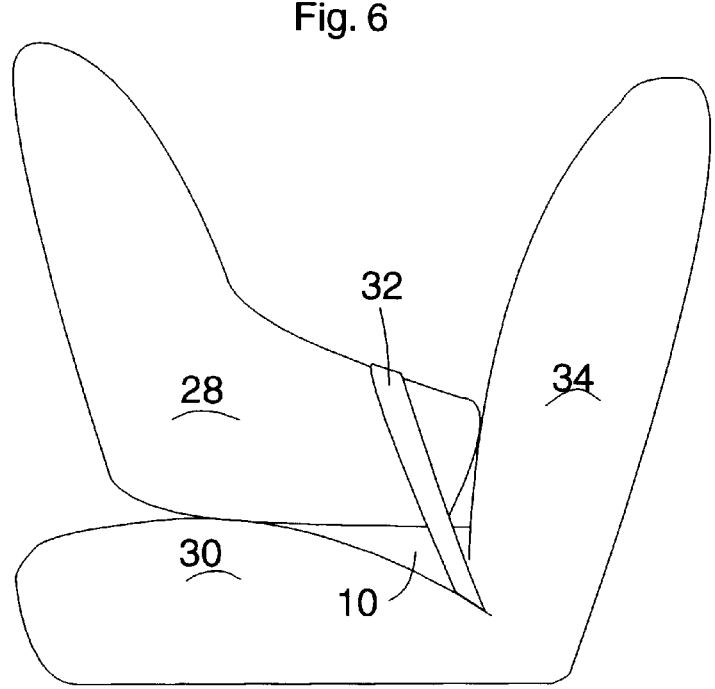

CHILDS SAFETY SEAT BOLSTER

This application claims the benefit of U.S. Provisional application Ser. No. 60/031,201, filed Nov. 21, 1996.

BACKGROUND OF THE INVENTION (1) Field of the Invention

The present invention relates generally to a device for leveling a child's safety seat when supported on a non-horizontal surface, and in particular to a bolster that can be positioned beneath a safety seat resting on the seat of a motor vehicle, so that the safety seat will be maintained in a horizontal position.

(2) Description of the Prior Art

Safety seats or carriers for babies are designed so that the baby's upper torso will be inclined at a desired angle, i.e., approximately 45° from horizontal when the seat is resting on a horizontal surface. These seats are normally used to secure the baby in a vehicle, and are placed on the vehicle seat, where they are held in place by a seat belt. It will be understood that the term vehicle, while normally referring to an automobile also contemplates trucks and other passenger vehicles. Babies under twenty pounds must be carried in a safety seat designed to face toward the rear of the vehicle.

The seating surfaces of most vehicle seats, however, are not horizontal. Therefore, when a safety seat is placed on the vehicle seat surface, the safety seat and the baby in the seat are tilted at an incorrect angle. For example, with a rear-facing seat, the baby's upper torso is positioned at an angle of greater than approximately 45° from horizontal, reducing the safety to the baby, and causing discomfort.

Child's safety seat manufacturers and seat safety experts recognize that this problem exists. However, the only resolution proposed until the present invention has been to use a tightly rolled towel or sheet that is pushed into the joinder of the seat and back. However, the towel is not always of the right size, and tends to shift in use. Moreover, the towel is too soft to provide a secure surface.

Therefore, it is an object of the present invention to provide a device for supporting a child's safety seat in a horizontal position on a vehicle seat. It is a particular object to provide a bolster for firmly supporting a rear facing child's safety seat on a vehicle seat. It is also an object of the present invention to provide a bolster that can be adjusted in size to accommodate different vehicle seats.

SUMMARY OF THE INVENTION

Generally, the objects of the invention are achieved by a bolster in the shape of an elongated wedge having a triangular cross-section perpendicular to its longitudinal dimension, and a length approximately equal to the width of the child's safety seat being supported. Preferably, the bolster cross-section is in the shape of an equilateral triangle.

In its preferred embodiment, the bolster is constructed in three sections, i.e., a central section with opposed, parallel surfaces, and two outer sections having cross-sections in the shape of a right triangle, each outer section having a surface corresponding to the size and shape of a face of the central section. Releasable attachment means, such as hook and loop fasteners, are used to secure the outer sections of the bolster to the central section, or to each other.

Thus, all of the bolster sections can be combined to form a larger bolster, or the two outer sections can be combined to form a smaller bolster. With these alternatives, the bolster can be sized to accommodate different vehicle seat constructions, and thus ensure that the safety seat is held in the desired horizontal position.

The bolster can be formed of a variety of materials, but is preferably formed of a firm or rigid plastic foam, such as polyurethane or polystyrene. The outer surface of each bolster section can be covered with a fabric covering or molded skin to facilitate ease in cleaning. Also, the bolster can be treated with other materials, such as fire retardants or antimicrobial agents. Specific compositions for these purposes will be known to those skilled in the art.

Thus, one aspect of the invention is to provide a bolster for supporting a rear-facing child's safety seat in a generally horizontal position on a tilted rear seating surface of a vehicle, the bolster being in the shape of an elongated wedge having a triangular cross-section and a length approximately equal to the width of the child's safety seat.

Another aspect of the invention is to provide a bolster for supporting a rear-facing child's safety seat having a given width on vehicle tilted rear seats, the bolster being comprised of a central section in the shape of a equilateral triangle with opposed first and second parallel, rectangular surfaces; and first and second triangular side sections, each having a rectangular side surface releasably attached to a rectangular surface of the central section.

It is still another aspect of the invention to provide a method of positioning a child's rear-facing car seat having a given width and a front edge on the rear seat of a vehicle, the vehicle rear seat having a seat back and a seating surface tilting downwardly toward the seat back to meet the seat back at a joinder comprising the steps of providing a bolster in the shape of an elongated wedge having a triangular cross-section with three apexes and a length approximately equal to the width of the child's safety seat; positioning the bolster on the vehicle seating surface with an apex of the bolster inserted into the joinder; and placing the child's safety seat in a rear-facing position on the vehicle seating surface with the child's safety seat front edge resting on the bolster to position the seat in a substantially horizontal position.

These and other aspects of the invention will become apparent to one skilled in the art from a reading of the detailed description of a preferred embodiment of the invention that follows.

BRIEF DESCRIPTION OF THE DRAWINGS

FIG. 5 illustrates a child's safety seat positioned on a vehicle seat and tilted at an angle.

FIG. 6 illustrates a child's safety seat positioned on a vehicle seat and positioned horizontally with the use of the present invention.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
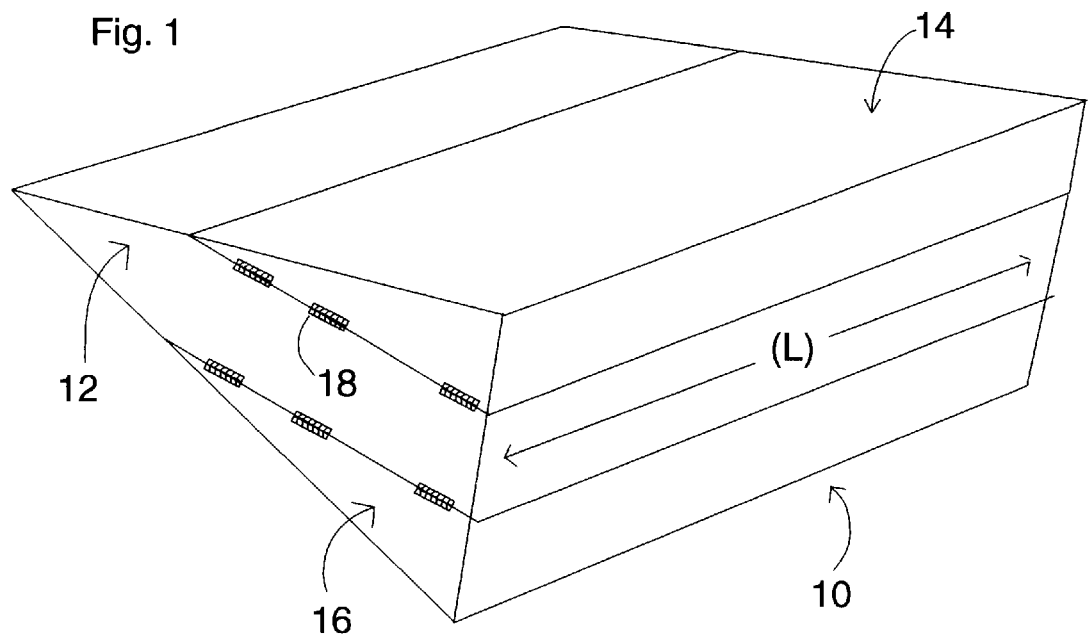
FIG. 1 is a perspective view of the bolster.
Figure 2:
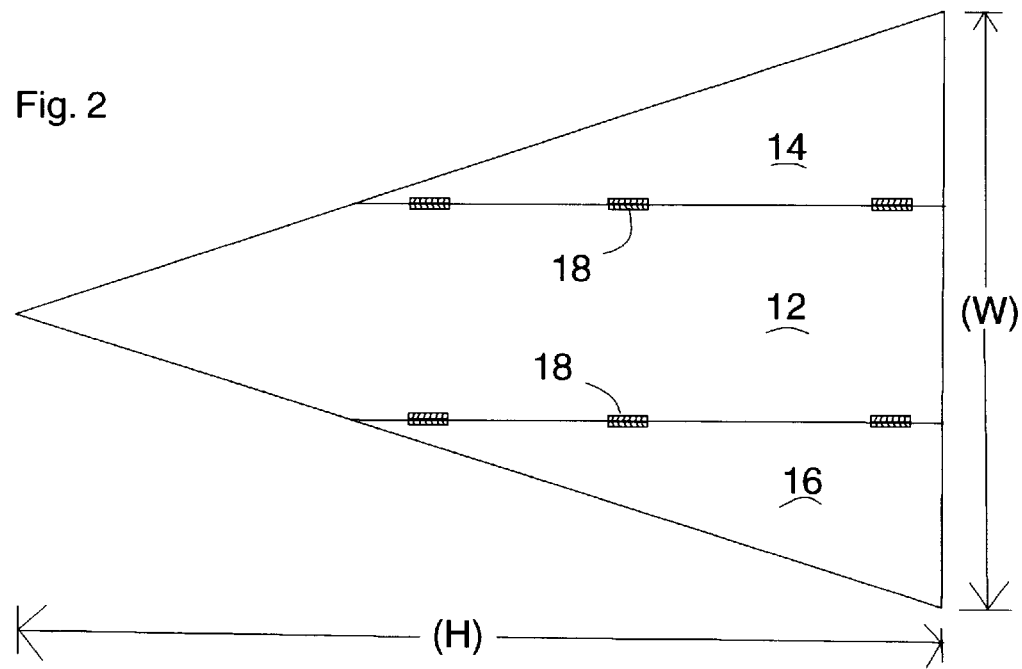
FIG. 2 is a side view of the bolster with all three sections assembled.
Figure 3:
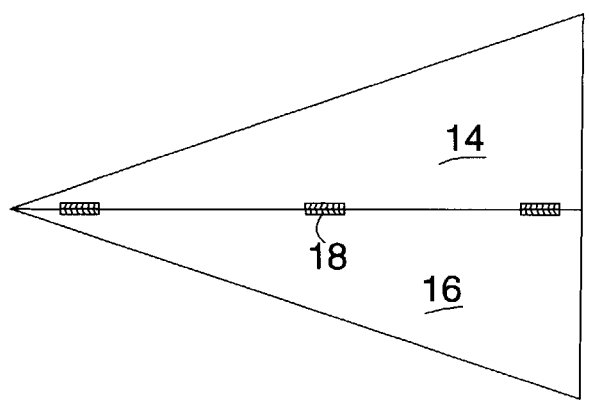
FIG. 3 is a side view of the bolster with the upper and lower sections assembled.

As best shown in the drawings, and especially FIGS. 1–3, bolster 10 is comprised of a central section 12, an upper section 14, and a lower section 16. Sections 14 and 16 are releasibly secured to section 12 with hook and loop fastener sections 18.

Central section 12 is in the shape of an equilateral triangle, with sides truncated to form two spaced, parallel, rectangular surfaces 20 and 22. Sections 14 and 16 have rectangular surfaces 24 and 26, respectively, corresponding in size to surfaces 20 and 22. Therefore, when surfaces 24 and 26 are secured to surfaces 20 and 22 with the hook and loop fastener sections 18, the three sections combine to form a wedge having the cross-sectional shape of an equilateral triangle.

Figure 4:
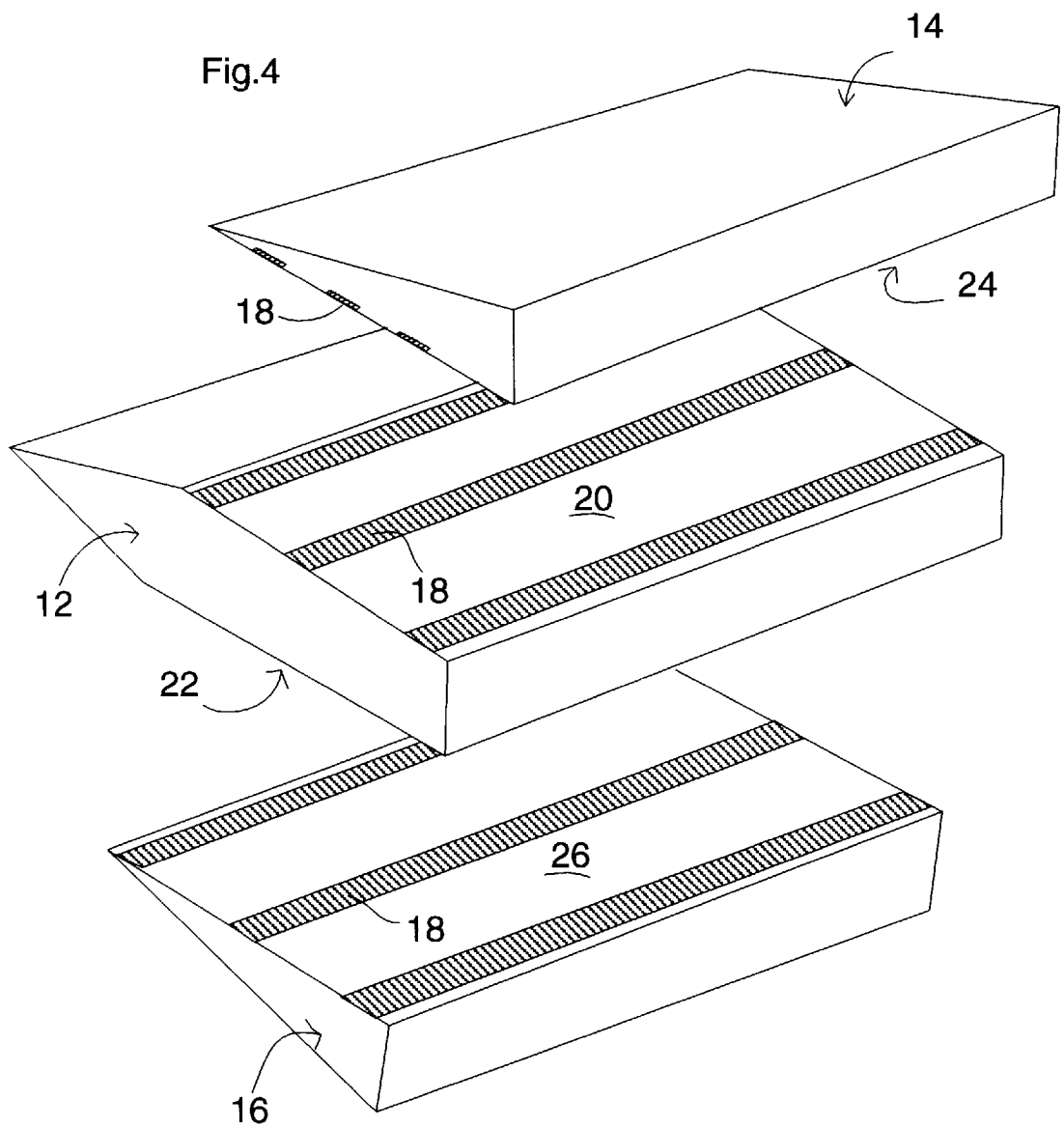
FIG. 4 is an exploded perspective view of the bolster.

If a smaller wedge is desired, in order to accommodate the placement of the safety seat on a vehicle seat with a shallower curve, i.e., a lesser tilt, surfaces 24 and 26 of sections 14 and 16 can be joined to each other, as illustrated in FIG. 4, to form a smaller wedge. This wedge also has the cross-section of an equilateral triangle.

The exact dimensions of the wedges are not critical. However, length (L) will generally be approximately equal to, or slightly less than, the width of a normal child's safety seat. For example, (L) may be from about 10–16 inches. Dimension (H) will normally be from about 8–12 inches, and dimension (W) will normally be about 8–12 inches. The bases of the sections will each normally be about ⅓ of the width of dimension (W), dividing the base of the bolster into three approximately equal rectangular segments.

FIG. 5 illustrates the problem that has been experienced with rear-facing child's safety seats prior to the present invention. When safety seat 28 is place on a vehicle seat 30 and secured in place with a seat belt 32, the front of seat 28 is drawn into the joinder or juncture between vehicle seat 28 and seat back 34, causing safety seat 30 to tilt, resulting in decreased safety and reduced comfort to the baby.

FIG. 6 illustrates the solution to this problem as provided by the present invention. Prior to placement of safety seat 28 on vehicle seat 30, an apex of the triangular bolster 10 is positioned in the joinder of seat 28 and back 34. When safety seat 28 is placed on seat 28 and bolster 10, the base of safety seat 28 is held in a horizontal position and seat belt 32 is tightened, thus providing the safety and comfort intended by the safety seat design.

Certain modifications and improvements will occur to those skilled in the art upon a reading of the foregoing description. By way of example, other types of fasteners can be used, or the hook and loop fasteners can be arranged in a differed manner. It should be understood that all such modifications and improvements have been deleted herein for the sake of conciseness and readability but are properly within the scope of the invention.

What is claimed is:

1. A bolster in combination with a rear-facing child's safety seat in a generally horizontal position on a tilted rear seat of a vehicle, the bolster being in the shape of an elongated wedge having a triangular cross-section and a length approximately equal to the width of the child's safety seat.

2. The combination of claim 1, wherein said cross-section of the bolster is in the shape of an equilateral triangle.

3. The combination of claim 1, wherein the bolster is formed of first and second sections having triangular cross-sections and rectangular faces of corresponding dimensions, said sections being releasibly attached to each other at their rectangular faces.

4. The combination of claim 3, wherein said sections have cross-sections in the shape of right triangles.

5. The combination of claim 1, wherein the bolster is formed of rigid plastic foam.

6. The combination of claim 1, wherein the bolster includes a fabric cover.

7. The combination of claim 1, wherein the bolster is treated with a material selected from the group consisting of fire retardants and antimicrobial agents.

8. A bolster for supporting a rear-facing child's safety seat having a given width on vehicle tilted rear seats, said bolster being comprised of:

a) a central section with opposed first and second parallel, rectangular side surfaces; and b) first and second triangular side sections, each having a rectangular side surface releasable attached to a rectangular surface of said central section.

9. The bolster of claim 8, wherein said triangular sections are attached to said central section with hook and loop fasteners.

10. The bolster of claim 8, wherein said central section is in the shape of an equilateral triangle with sides truncated to form said rectangular surfaces.

11. The bolster of claim 8, wherein said triangular sections have rectangular faces of corresponding dimensions, said sections being releasibly attachable to each other at their rectangular faces.

12. The bolster of claim 8, wherein said central section includes a apex, a base and parallel rectangular sides, and said side sections are in the shape of right triangles, each having a base in a plane with the base of said central section base, and a rectangular side surface releasable attached to a rectangular surface of said central section.

13. The bolster of claim 8, wherein the bases of said central and side sections are of substantially the same dimensions.

14. The bolster of claim 8, wherein said side sections are attached to said central section with hook and loop fasteners.

15. The bolster of claim 8, having a length of from about 10 to about 16 inches, a height of from about 8 to about 12 inches, and a width of from about 8 to about 12 inches.

16. A method of positioning a child's rear-facing safety seat having a given width and a front edge on the rear seat of a vehicle, said rear seat having a seat back and a seating surface tilting downwardly toward said seat back and meeting said seat back at a joinder, comprising:

a) providing a bolster in the shape of an elongated wedge having a triangular cross-section with an apex and a length approximately equal to the width of the child's safety seat;

b) positioning said bolster on said seating surface with an apex of said bolster in said joinder; and c) placing said child's seat in a rear-facing position on said seating surface with said safety seat front edge resting on said bolster, whereby said seat is maintained by said bolster is a substantially horizontal position.

17. The method of claim 16, wherein said bolster is formed of first and second sections having triangular cross-sections and rectangular faces of corresponding dimensions, said sections being releasibly attached to each other at their rectangular faces.

18. The method of claim 17, wherein said sections have cross-sections in the shape of right triangles.

19. The method of claim 16, wherein said bolster includes a central section in the shape of a equilateral triangle with opposed first and second parallel, rectangular surfaces; and first and second triangular side sections, each having a rectangular side surface releasable attached to a rectangular surface of said central section.

20. The method of claim 16, wherein said bolster has a width approximately equal to the width of said child's seat.

\* \* \* \* \*